US011117580B2

(12) United States Patent
Lee et al.

(10) Patent No.: US 11,117,580 B2
(45) Date of Patent: Sep. 14, 2021

(54) VEHICLE TERMINAL AND OPERATION METHOD THEREOF

(71) Applicant: LG Electronics Inc., Seoul (KR)

(72) Inventors: Taekyung Lee, Seoul (KR); Hyeonju Bae, Seoul (KR); Sangyol Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 16/552,514

(22) Filed: Aug. 27, 2019

(65) Prior Publication Data
US 2019/0382012 A1 Dec. 19, 2019

(30) Foreign Application Priority Data
Jul. 25, 2019 (KR) .................. 10-2019-0090243

(51) Int. Cl.
B60W 30/17 (2020.01)
G06K 9/00 (2006.01)
B60W 30/14 (2006.01)
H04W 4/46 (2018.01)

(52) U.S. Cl.
CPC .......... B60W 30/17 (2013.01); B60W 30/143 (2013.01); G06K 9/00825 (2013.01); H04W 4/46 (2018.02)

(58) Field of Classification Search
CPC .................................................. B60W 30/17
See application file for complete search history.

(56) References Cited

U.S. PATENT DOCUMENTS

| 8,600,609 | B2 | | 12/2013 | Holzmann et al. | |
| 10,290,210 | B2 | * | 5/2019 | Wolterman | B60W 50/14 |
| 10,507,813 | B2 | * | 12/2019 | Zhu | B60T 17/22 |
| 10,800,428 | B2 | * | 10/2020 | Bae | G08G 1/165 |
| 2006/0155469 | A1 | * | 7/2006 | Kawasaki | G01S 13/931 |
| | | | | | 701/301 |
| 2016/0267795 | A1 | * | 9/2016 | Miyazawa | B60W 30/12 |
| 2016/0267796 | A1 | * | 9/2016 | Hiroma | H04L 67/12 |
| 2017/0162051 | A1 | * | 6/2017 | Satoh | G08G 1/09 |
| 2017/0297566 | A1 | * | 10/2017 | Matsumura | B60W 40/08 |
| 2018/0015827 | A1 | * | 1/2018 | Takano | B60T 7/22 |
| 2018/0037112 | A1 | * | 2/2018 | Otake | B60W 10/184 |
| 2018/0037214 | A1 | * | 2/2018 | Otake | B60W 40/105 |
| 2018/0037215 | A1 | * | 2/2018 | Otake | B60W 50/0098 |
| 2018/0037230 | A1 | * | 2/2018 | Otake | B60W 10/06 |
| 2018/0088572 | A1 | * | 3/2018 | Uchida | B60W 10/18 |
| 2018/0111628 | A1 | * | 4/2018 | Tamagaki | B60W 30/16 |
| 2018/0276912 | A1 | * | 9/2018 | Zhou | G07C 5/0808 |
| 2018/0281791 | A1 | * | 10/2018 | Fukaya | B60W 30/0956 |

(Continued)

FOREIGN PATENT DOCUMENTS

WO WO2017008801 1/2017

Primary Examiner — Alex C Dunn
(74) Attorney, Agent, or Firm — Fish & Richardson P.C.

(57) ABSTRACT

Disclosed are a method for recognizing whether an Adaptive Cruise Control (ACC) system operates abnormally based on information on a turn-on state of a brake lamp of a preceding vehicle, and a vehicle terminal therefor. One or more of a vehicle, a vehicle terminal, and an autonomous vehicle disclosed in the present invention may work in conjunction with Artificial Intelligence (AI), Unmanned Aerial Vehicle (UAV), a robot, an Augmented Reality (AR) device, a Virtual Reality (VR) device, a 5G service related device, etc.

18 Claims, 5 Drawing Sheets

(56) References Cited

U.S. PATENT DOCUMENTS

| | | | |
|---|---|---|---|
| 2020/0035045 A1* | 1/2020 | Kim | G06N 3/08 |
| 2020/0139992 A1* | 5/2020 | Oba | B60W 50/14 |
| 2020/0148214 A1* | 5/2020 | Tamagaki | B60W 30/14 |
| 2020/0298853 A1* | 9/2020 | Bast | B60W 40/12 |
| 2021/0016783 A1* | 1/2021 | Watanabe | G06K 9/6267 |
| 2021/0061275 A1* | 3/2021 | Takahama | B60W 30/165 |

\* cited by examiner

FIG. 7
| Level | Driving control method |
|---|---|
| Level 1 | Speed reduction by 10% |
| Level 2 | Speed reduction by 30%, abnormal operation notification |
| Level 3 | Speed reduction by 50%, lane change |
| Level 4 | Braking, remote control request |
FIG. 8
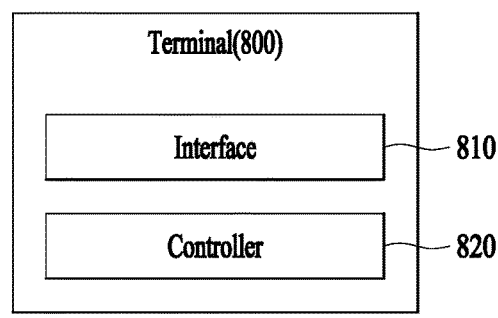
FIG. 9
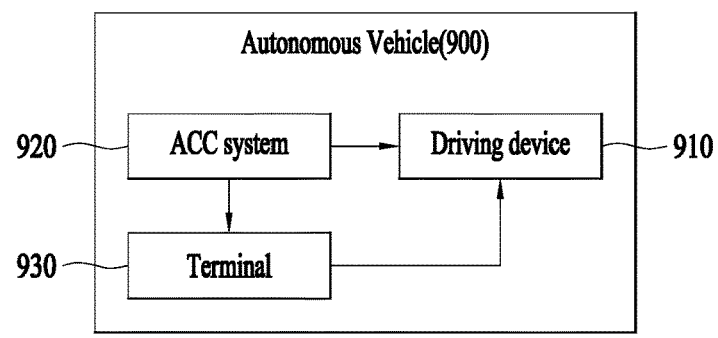

ved to control the driving device; and a terminal, wherein the terminal is configured to acquire information on a turn-on state of a brake lamp of a preceding vehicle, when the brake lamp of the preceding vehicle is in the turn-on state, monitor operation of the ACC system and recognize whether the ACC system operates abnormally, and, when abnormal operation of the ACC system is recognized, control driving of the vehicle.

In yet another general aspect of the present disclosure, there is provided a computer readable non-volatile recording medium in which a program to be executed in a computer is recorded.

Details of other embodiments are included in the detailed description and the accompanying drawings.

According to the present disclosure, a terminal is capable of recognizing abnormal operation of an Adaptive Cruise Control (ACC) system based on a turn-on state of a tail lamp of a preceding vehicle, thereby preventing an accident caused by the ACC system. In particular, as an autonomous vehicle heavily depends on the ACC system when driving autonomously, an accident caused by abnormal operation of the ACC system can be prevented effectively.

However, the effects of the present disclosure are not limited to the above-mentioned effects, and effects other than the above-mentioned effects can be clearly understood by those of ordinary skill in the art from the following descriptions.

VEHICLE TERMINAL AND OPERATION METHOD THEREOF

CROSS-REFERENCE TO RELATED APPLICATION

This application is based on and claims priority under 35 U.S.C. § 119(a) to Korean Patent Application No. 10-2019-0090243, which was filed on Jul. 25, 2019, in the Korean Intellectual Property Office, the disclosure of which is incorporated herein in its entirety by reference.

BACKGROUND

1. Field

The present disclosure relates to a vehicle terminal and an operation method thereof. More specifically, the present disclosure relates to a vehicle terminal capable of recognizing abnormal operation of an Adaptive Cruise Control (ACC) system and an operation method thereof.

2. Description of the Related Art

As interest in Advanced Driver Assistance Systems (ADASs) such as an Adaptive Cruise Control (ACC) system for maintaining a safe distance from a vehicle ahead is recently increasing, it is necessary to more effectively provide the up-to-date ADASs.

In addition, a self-driving vehicle refers to a vehicle equipped with an autonomous driving apparatus capable of recognizing a surrounding environment of the vehicle and a vehicle state to thereby controlling driving of the vehicle. Along with researches on the self-driving vehicle, researches on various services for improving user convenience with the self-driving vehicle are being conducted as well.

SUMMARY

Embodiments disclosed herein relate to a vehicle terminal and an operation thereof. However, the technical goal of the present disclosure is not limited thereto, and other technical goals may be inferred from the following embodiments.

In one general aspect of the present disclosure, there is provided an operation method of a terminal included in a vehicle having an Adaptive Cruise Control (ACC) system installed therein, the method including: acquiring information on a turn-on state of a brake lamp of a preceding vehicle; when the brake lamp of the preceding vehicle is in the turn-on state, monitoring operation of the ACC system and recognizing whether the ACC system operates abnormally; and, when abnormal operation of the ACC system is recognized, controlling driving of the vehicle.

In another general aspect of the present invention, there is provided a terminal included in a vehicle having an Adaptive Cruise Control (ACC) system installed therein, the terminal including: an interface configured to acquire information on a turn-on state of a brake lamp of a preceding vehicle; and a controller configured to, when the brake lamp of the preceding vehicle is in the turn-on state, monitor operation of the ACC system and recognize whether the ACC system operates abnormally, and, when abnormal operation of the ACC system is recognized, control driving of the vehicle.

In yet another general aspect of the present disclosure, there is provided an autonomous vehicle including: a driving device; an Adaptive Cruise Control (ACC) system config-

BRIEF DESCRIPTION OF THE DRAWINGS

FIG. 7 shows an embodiment in which a terminal controls driving of a vehicle according to a level of abnormal operation of an Adaptive Cruise Control (ACC) system.

FIG. 8 shows a block diagram of a vehicle terminal.

FIG. 9 shows a block diagram of an autonomous vehicle.

DETAILED DESCRIPTION

Figure 1:
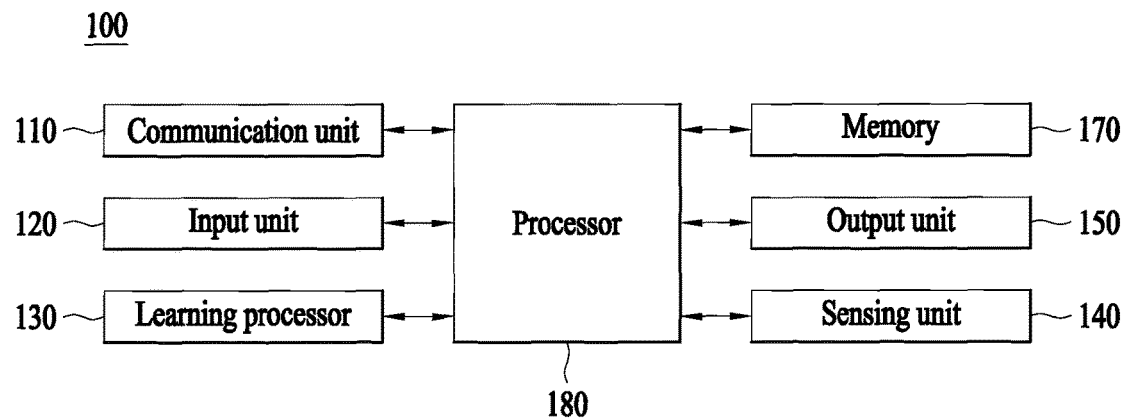
FIG. 1 shows an Artificial Intelligence (AI) device according to an embodiment of the present invention.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergency of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial Intelligence (AL)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, embodiments of the present disclosure will be described in detail with reference to the drawings.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 1, Terminal 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
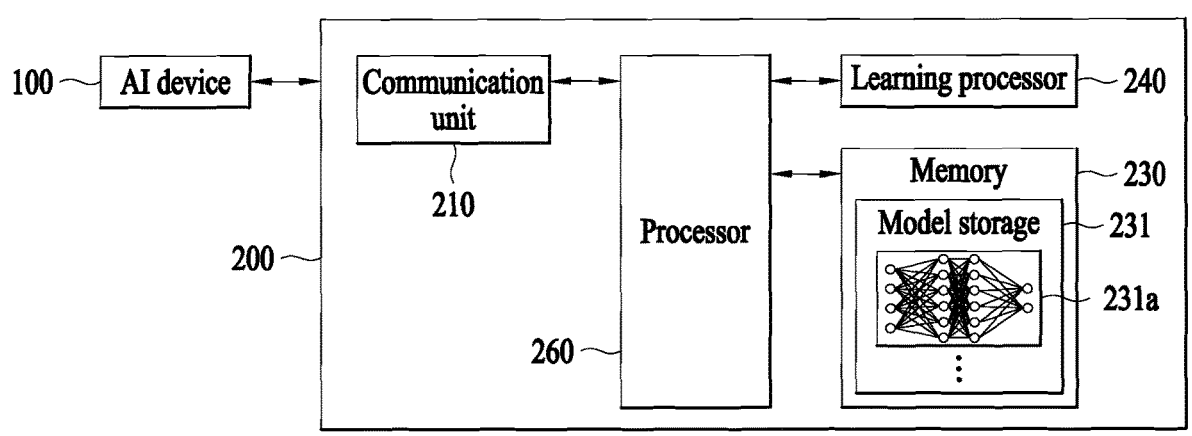
FIG. 2 shows an AI server according to an embodiment of the present invention.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
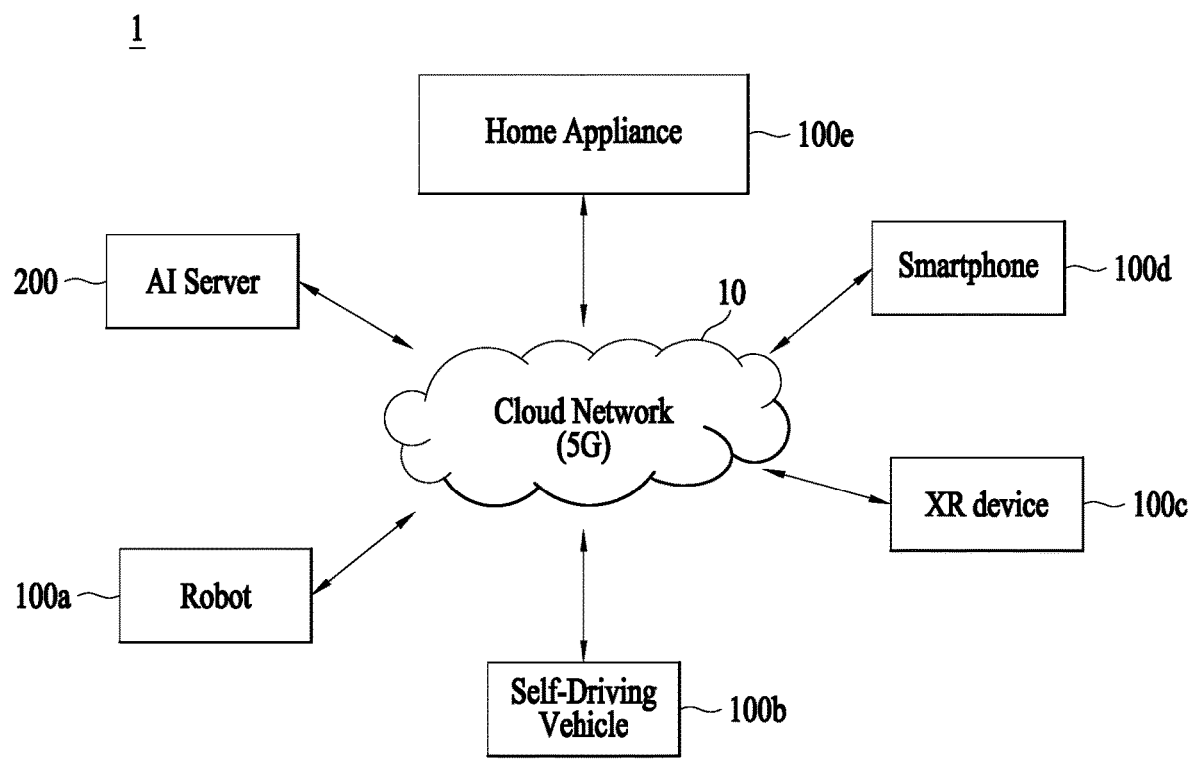
FIG. 3 shows an AI system according to an embodiment of the present disclosure.

FIG. 3 illustrates an AI system 1 according to an embodiment of the present disclosure.

Referring to FIG. 3, in AI system 1, at least one of AI server 200, a robot 100a, an autonomous driving vehicle 100b, an XR device 100c, a smart phone 100d, and a home appliance 100e is connected to a cloud network 10. Here, robot 100a, autonomous driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, autonomous driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Autonomous driving vehicle 100b may be realized into a mobile robot, a vehicle, or an unmanned air vehicle, for example, through the application of AI technologies.

Autonomous driving vehicle 100b may include an autonomous driving control module for controlling an autonomous driving function, and the autonomous driving control module may mean a software module or a chip realized in hardware. The autonomous driving control module may be a constituent element included in autonomous driving vehicle 100b, but may be a separate hardware element outside autonomous driving vehicle 100b so as to be connected to autonomous driving vehicle 100b.

Autonomous driving vehicle 100b may acquire information on the state of autonomous driving vehicle 100b using sensor information acquired from various types of sensors, may detect (recognize) the surrounding environment and an object, may generate map data, may determine a movement route and a driving plan, or may determine an operation.

Here, autonomous driving vehicle 100b may use sensor information acquired from at least one sensor among a LIDAR, a radar, and a camera in the same manner as robot 100a in order to determine a movement route and a driving plan.

In particular, autonomous driving vehicle 100b may recognize the environment or an object with respect to an area outside the field of vision or an area located at a predetermined distance or more by receiving sensor information from external devices, or may directly receive recognized information from external devices.

Autonomous driving vehicle 100b may perform the above-described operations using a learning model configured with at least one artificial neural network. For example, autonomous driving vehicle 100b may recognize the surrounding environment and the object using the learning model, and may determine a driving line using the recognized surrounding environment information or object information. Here, the learning model may be directly learned in autonomous driving vehicle 100b, or may be learned in an external device such as AI server 200.

At this time, autonomous driving vehicle 100b may generate a result using the learning model to perform an operation, but may transmit sensor information to an external device such as AI server 200 and receive a result generated by the external device to perform an operation.

Autonomous driving vehicle 100b may determine a movement route and a driving plan using at least one of map data, object information detected from sensor information, and object information acquired from an external device, and a drive unit may be controlled to drive autonomous driving vehicle 100b according to the determined movement route and driving plan.

The map data may include object identification information for various objects arranged in a space (e.g., a road) along which autonomous driving vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, autonomous driving vehicle 100b may perform an operation or may drive by controlling the drive unit based on user control or interaction. At this time, autonomous driving vehicle 100b may acquire interactional intention information depending on a user operation or voice expression, and may determine a response based on the acquired intention information to perform an operation.

Figure 4:
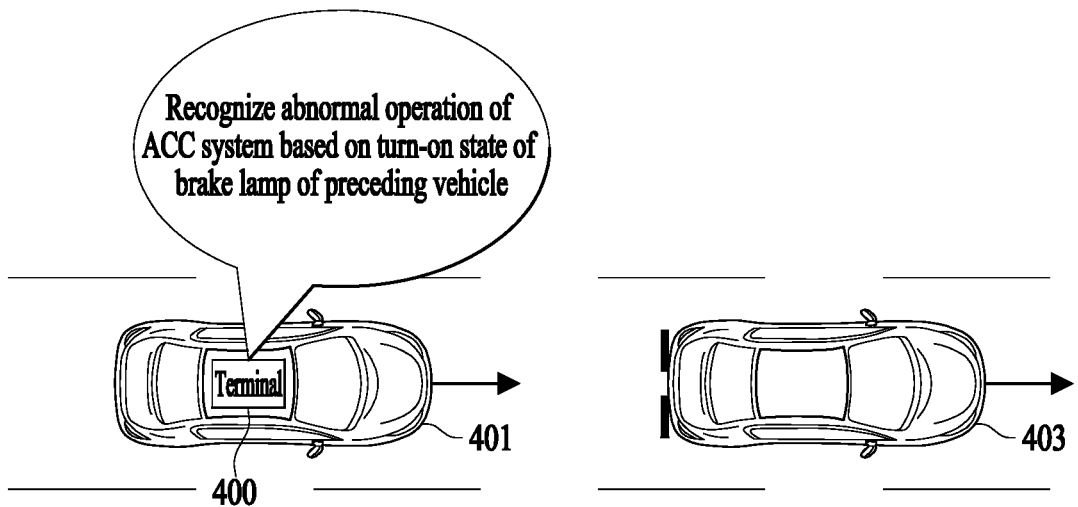
FIG. 4 shows an embodiment in which a terminal included in a vehicle operates.

FIG. 4 shows an embodiment where a terminal included in a vehicle operates.

A terminal 400 may be included in a vehicle 401. An Adaptive Cruise Control (ACC) system may be installed in the vehicle 401. The ACC system is a kind of An Advanced Driver Assistance System (ADAS) and refers to a system to automatically control a driving speed so as to maintain a safe distance from a preceding vehicle. In addition, the ACC system may include an Autonomous Emergency Braking (AEB) system.

The terminal 400 may recognize a turn-on state of a brake lamp of a preceding vehicle 403 traveling ahead of the vehicle 401. The brake lamp may be disposed at rear of the vehicle and may be a tail lamp that turns on upon braking.

The terminal 400 may recognize abnormal operation of the ACC system of the vehicle 401 based on the turn-on state of the brake lamp of the preceding vehicle 403. For example, in a case where a distance between the vehicle 401 and the preceding vehicle 403 decreases although the brake lamp of the preceding vehicle 403 is turned on, the terminal 400 may recognize that the ACC system operates abnormally. In other words, the terminal 400 may determine a braking state of the preceding vehicle 403 through the turn-on state of the brake lamp of the preceding vehicle 403, and, although the preceding vehicle 403 is in the braking state, the terminal 400 may determine that a distance between the vehicle 401 and the preceding vehicle 403 decreases by the abnormal operation of the ACC system.

As it is recognized that the ACC system of the vehicle 401 operates normally, the terminal 400 may control driving of the vehicle 401. For example, since the distance between the vehicle 401 and the preceding vehicle 403 decreases although the tail lamp of the preceding vehicle 403 is turned on, the terminal 400 may control the ACC system instead of the vehicle so that the vehicle 401 reduces a driving speed.

Thus, the terminal 400 may recognize abnormal operation of the ACC system based on the turn-on state of the tail lamp of the preceding vehicle 403 and thus may prevent an accident caused by malfunction of the ACC system. In other words, the terminal 400 may secure redundancy of the ACC system based on the turn-on state of the tail lamp of the preceding vehicle 40. In particular, as an autonomous vehicle heavily depends on the ACC system when driving autonomously, an accident caused by abnormal operation of the ACC system can be prevented effectively.

Figure 5:
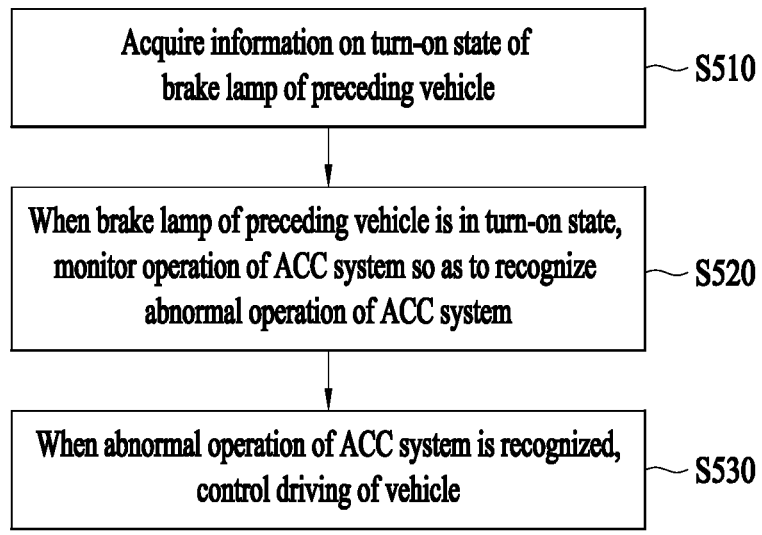
FIG. 5 shows an embodiment of an operation method of a terminal included in a vehicle.

FIG. 5 is a flowchart of an operation method of a terminal included in a vehicle.

The flowchart shown in FIG. 5 includes steps that are processed in time series by the terminal 400 shown in FIG. 4. Accordingly, details described regarding operations of the terminal 400 shown in FIG. 4 may apply to the flowchart shown in FIG. 5 even if omitted in the following.

In step S510, the terminal 400 may acquire information on a turn-on state of a brake lamp of a preceding vehicle. The terminal 400 may be included in a vehicle and may acquire information on a turn-on state of a brake lamp of a preceding vehicle that is located ahead of the vehicle. In one example, the vehicle including the terminal 400 may be an autonomous vehicle.

In one example, the terminal 400 may acquire information on the turn-on state of the brake lamp of the preceding vehicle through an image sensor of the vehicle. Specifically, the image sensor of the vehicle may sense an image of the brake lamp of the preceding vehicle, and the terminal 400 may recognize the turn-on state of the brake lamp of the preceding vehicle based on a sensing result of the image sensor.

In another example, the terminal 400 may acquire information on the turn-on state of the brake lamp of the preceding vehicle through a communication unit of the vehicle. Specifically, since the communication unit is capable of communicating with the preceding vehicle through Vehicle to Vehicle (V2V) wireless communication, the communication unit of the vehicle may receive the information on the turn-on state of the brake lamp from the preceding vehicle and thereby recognize the turn-on state of the brake lamp of the preceding vehicle through the communication unit of the vehicle.

In step S520, when the brake lamp of the preceding vehicle is in the turn-on state, the terminal 400 may monitor operation of the ACC system and thereby recognize whether the ACC system operates abnormally. Specifically, when the brake lamp of the preceding vehicle is in the turn-on state, the terminal 400 may monitor at least one of a driving control command output from the ACC system or a result of sensing sensors by the ACC system, and thereby recognize whether the ACC system operates abnormally.

In a case where the ACC system has not output a deceleration command for a predetermined time since a turn-on timing of the brake lamp of the preceding vehicle, the terminal 400 may recognize that the ACC system operates abnormally. In other words, in a case where the preceding vehicle is braked, the ACC system operating normally outputs a deceleration command to maintain a distance from the preceding vehicle; however, in a case where the ACC system has not output a deceleration command for a predetermined time since the braking of the preceding vehicle, the terminal 400 may recognize that the ACC system operates abnormally. On the contrary, in a case where the ACC system has output a deceleration command for the predetermined time since the turn-on timing of the brake lamp of the preceding vehicle, the terminal 400 may recognize that the ACC system operates normally.

In a case where sensors in the ACC systems sense that a distance between the preceding vehicle and the vehicle has not been decreased for the predetermined time since the turn-on timing of the brake lamp of the preceding vehicle, the terminal 400 may recognize that the ACC system operates abnormally. In addition, in a case where the sensors in the ACC systems sense that a driving speed of the preceding vehicle has not been decreased for the predetermined time since the turn-on timing of the brake lamp of the preceding vehicle, the terminal 400 may recognize that the ACC system operates abnormally. On the contrary, in a case where the sensors in the ACC systems sense that the distance between the preceding vehicle and the vehicle or a driving speed of the preceding vehicle has been decreased for the predetermined time since the turn-on timing of the brake lamp of the preceding vehicle, the terminal 400 may recognize that the ACC system operates normally.

The terminal 400 may recognize abnormal operation of the ACC system by classifying the abnormal operation into multiple levels. In other words, the terminal 400 may classify abnormal operation of the ACC system into multiple levels in consideration of a degree in which the ACC system operates abnormally. For example, in the case of the highest level of abnormal operation of the ACC system, the terminal 400 may recognize that the abnormal operation of the ACC system corresponds to Level 4, and, in the case of the lowest level of abnormal operation of the ACC system, the terminal 400 may recognize that the abnormal operation of the ACC system corresponds to Level 1.

By considering a type of a driving control command output from the ACC system when the brake lamp of the preceding vehicle is turned on, the terminal 400 may classify and recognize abnormal operation of the ACC system as one of multiple levels. For example, in a case where the brake lamp of the preceding vehicle is turned on and a driving control command output from the ACC system is a constant-speed driving command, the terminal 400 may recognize abnormal operation of the ACC system as a caution state, and, in a case where the brake lamp of the preceding brake is turned on and a driving control command output from the ACC system is an acceleration command, the terminal 400 may recognize abnormal operation of the ACC system as a serious state.

Based on a time for which the ACC system operates abnormally during a turn-on period of the brake lamp of the preceding vehicle, the terminal 400 may classify and recognize abnormal operation of the ACC system as one of multiple levels. For example, in a case where the ACC system has not output a deceleration command for 0.2 seconds during the turn-on period of the brake lamp, the terminal 400 may recognize abnormal operation of the ACC system as Level 1, and, in a case where the ACC system has not output a deceleration command for 1 second during the turn-on period of the brake lamp, the terminal 400 may recognize abnormal operation of the ACC system as Level 4.

In step S530, in a case where abnormal operation of the ACC system is recognized in the step S520, the terminal 400 may control driving of the vehicle. Specifically, in a case where the abnormal operation of the ACC system is recognized, the terminal 400 may control driving of the vehicle by controlling a driving device of the vehicle. For example, in a case where abnormal operation of the AC system is recognized, the terminal 400 may control the ACC system instead of the vehicle so that the vehicle decelerates. In another example, in a case where abnormal operation of the ACC system is recognized, the terminal 400 may perform control so that the vehicle makes a lane change.

In a case where abnormal operation of the ACC system is recognized as one of multiple levels, the terminal 400 may control driving of the vehicle according to the recognized level of the abnormal operation of the ACC system. For example, in a case where abnormal operation of the ACC system is recognized as Level 1, the terminal 400 may control driving of the vehicle so that a driving speed of the vehicle is decreased by 10%, and, in a case where abnormal operation of the ACC system is recognized as Level 4, the terminal 400 may control driving of the vehicle so that a driving speed of the vehicle is decreased by 50%.

Figure 6:
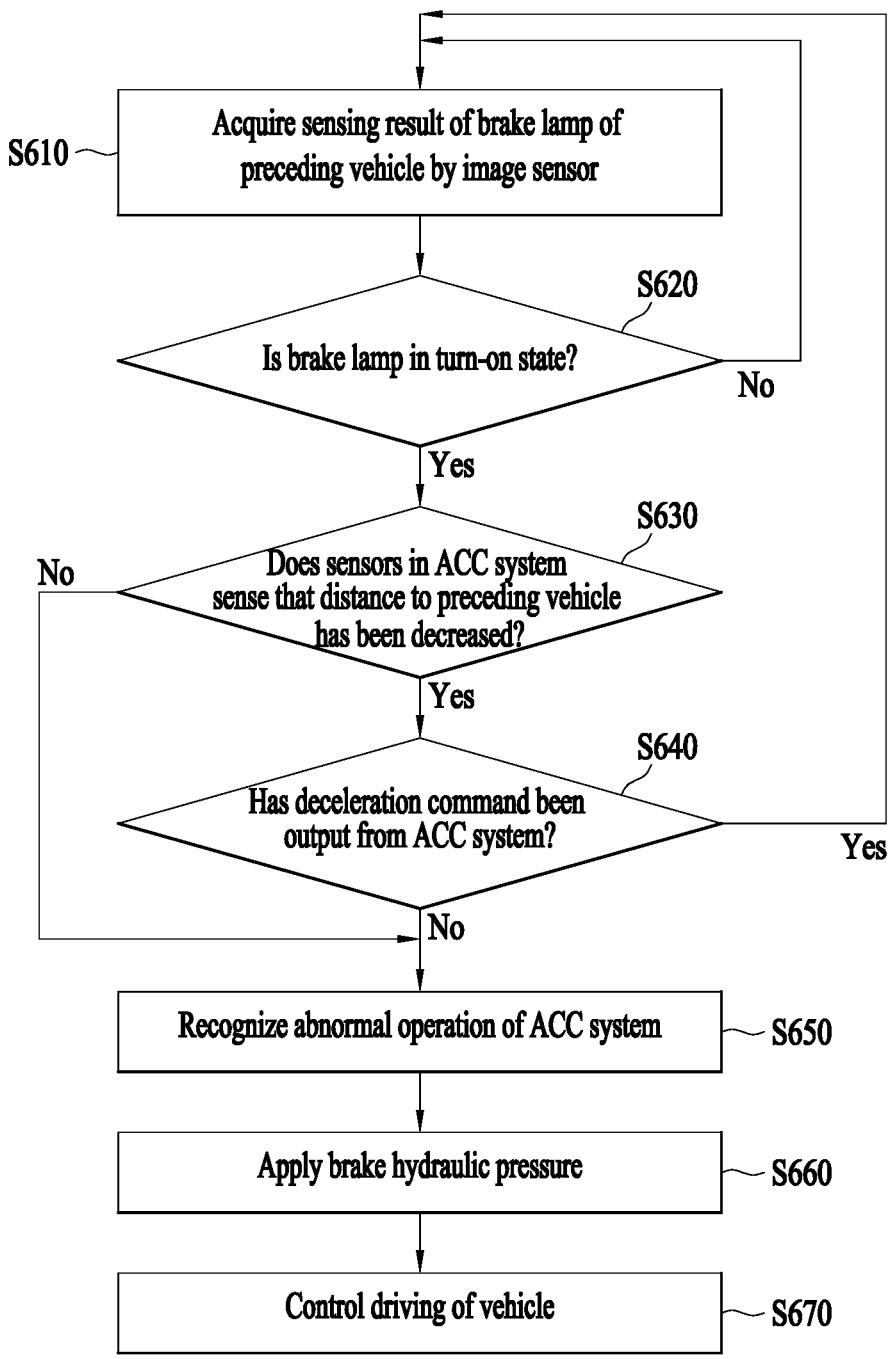
FIG. 6 shows a specific embodiment of an operation method of a terminal included in a vehicle.

FIG. 6 shows a specific example of an operation method of a terminal included in a vehicle.

The flowchart shown in FIG. 6 includes steps that are processed in time series by the terminal 400 shown in FIG. 4. Accordingly, details described regarding operations of the terminal 400 shown in FIG. 4 may apply to the flowchart shown in FIG. 6 even if omitted in the following.

In step S610, the terminal 400 may acquire a result of sensing a brake lamp of a preceding vehicle through an image sensor. Specifically, an image sensor included in the vehicle may sense an image of the brake lamp of the preceding vehicle, and the terminal 400 may acquire the sensed image from the image sensor.

In step S620, the terminal 400 may determine, based on a sensing result acquired in the step S610, as to whether the brake lamp of the preceding vehicle is in a turn-on state. Specifically, the terminal 400 may check an image sensed through the image sensor and determine whether the brake lamp is in a turn-on state or a turn-off state. In addition, upon sensing of the image sensor, the terminal 400 may check whether backlight occurs and determine whether the brake lamp is in the turn-on state. Accordingly, the terminal 400 may prevent an error which is the brake lamp is recognized as being turned on due to backlight.

In a case where it is determined in the step S620 that the brake lamp of the preceding vehicle is in the turn-on state, in the S630, the terminal 400 may determine whether sensors in the ACC system senses that a distance between the vehicle and the preceding vehicle has been decreased. In a case where the sensors in the ACC system sense that the distance between the vehicle and the preceding vehicle has not been decreased even when the brake lamp is in the turn-on state, the terminal 400 may recognize abnormal operation of the ACC system in step S650. In this case, the terminal 400 may recognize that the sensors in the ACC system operate abnormally.

In a case where it is determined in the step S620 that the sensors in the ACC system sense that the distance between the vehicle and the preceding vehicle has been decreased, in the S640, the terminal 400 may determine whether a deceleration command has been output from the ACC system of the vehicle. Specifically, in a case where the brake lamp of the preceding vehicle is in the turn-on state and the sensors in the ACC system sense that the distance between the vehicle and the preceding vehicle has been decreased, the terminal 400 may determine whether a driving control command output from the ACC system is a deceleration command. In a case where the driving control command output from the ACC system is not a deceleration command, the terminal 400 may recognize abnormal operation of the ACC system in the step S650. For example, in a case where the driving control command output from the ACC system is a constant-speed driving command or an acceleration command, the terminal 400 may recognize that the ACC system operates abnormally. In this case, the terminal 400 may recognize that a controller in the ACC system operates abnormally.

In step S660, the terminal 400 may apply brake hydraulic pressure of the vehicle. In other words, the terminal 400 may apply brake hydraulic pressure and thereby generate a predetermined braking pressure so that a braking speed can be decreased at a next braking operation. In addition, in a case where a deceleration command is output from the ACC system in the step S640, the terminal 400 may check whether brake hydraulic pressure of the vehicle is already applied and thereby cancel the already applied brake hydraulic pressure.

In step S670, the terminal 400 may control driving of the vehicle. For example, in a case where abnormal operation of the ACC system is recognized, the terminal 400 may control braking of the vehicle based on the already applied brake hydraulic pressure.

FIG. 7 shows an example in which a terminal controls driving of a vehicle according to a level of abnormal operation of an ACC system.

The terminal 400 may recognize abnormal operation of the ACC system as one of multiple levels, and may control driving of the vehicle according to the recognized level of the abnormal operation of the ACC system. In other words, the terminal 400 may perform a different control method according to a level of abnormal operation of the ACC system.

Referring to FIG. 7, the terminal 400 may recognize abnormal operation of the ACC system as one of Level 1 to Level 4, and may perform one of four driving control methods according to a level of the abnormal operation of the ACC system.

The terminal 400 may recognize abnormal operation of the ACC system as Level 1. For example, in a case where sensors in the ACC system sense that a distance between the vehicle and the preceding vehicle has not been decreased for 0.1 second during a turn-on period of the brake lamp, the terminal 400 may recognize the abnormal operation of the ACC system as Level 1. The terminal 400 may control driving of the vehicle according to Level 1. Specifically, the terminal 400 may control driving of the vehicle so that a driving speed of the vehicle is decreased by 10%. In addition, in a case where the ACC system includes a plurality of sensors, the terminal 400 may adjust a weight for a sensing result of each of the plurality of sensors. For example, the terminal 400 may reduce weights for the plurality of sensors in a manner in which a weight for a sensor having measured a value farthest from a mean among sensors for measuring a distance between the vehicle and the preceding vehicle is increased whereas weights for the remaining sensors are increased.

The terminal 400 may recognize abnormal operation of the ACC system as Level 2. For example, in a case where a deceleration command has not output from the ACC system for 0.5 second during a turn-on period of the brake lamp, the terminal 400 may recognize abnormal operation of the ACC system as Level 2. The terminal 400 may control driving of the vehicle according to Level 2 so that a driving speed of the vehicle is decreased by 30%. In addition, the terminal

400 may provide a notification indicating that the ACC system operates abnormally. For example, the terminal 400 may provide an external server or an occupant in the vehicle with a notification indicating that the ACC system operates abnormally.

The terminal 400 may recognize abnormal operation of the ACC system as Level 3. For example, in a case where sensors in the ACC system sense that a distance between the vehicle and the preceding vehicle has not been decreased for 1 second during a turn-on period of the brake lamp, the terminal 400 may recognize abnormal operation as Level 3. The terminal 400 may control driving of the vehicle according to Level 3 so that a driving speed of the vehicle is decreased by 50%. In addition, the terminal 400 may check if another vehicle exists in a next lane of a current lane on which the vehicle is traveling, and, if not, may perform control so that the vehicle makes a lane change from the current lane to the next lane.

The terminal 400 may recognize abnormal operation of the ACC system as Level 4. For example, in a case where sensors in the ACC system sense that a distance between the vehicle and the preceding vehicle has not been decreased for 1.5 second during a turn-on period of the brake lamp, the terminal 400 may recognize abnormal operation as Level 4. The terminal 400 may control driving of the vehicle according to Level 4 so that the vehicle be braked. In addition, the terminal 400 may request a remote control from an external server. In other words, the terminal 400 may request that the external server remotely control driving of the vehicle.

FIG. 8 shows a block diagram of a terminal included in a vehicle.

A terminal 800 may be a device that is disposed inside a vehicle and assists driving of the vehicle. The terminal 800 may include an interface 810 and a controller 820 according to an embodiment. The terminal 800 shown in FIG. 8 includes only elements related to the present embodiment. Therefore, those of ordinary skill in the technical field related to the present embodiment will appreciate that general-use elements other than the elements shown in FIG. 8 may be further included.

The interface 810 may acquire information on a turn-on state of a brake lamp of a preceding vehicle. The interface 810 may acquire the information on the turn-on state of the brake lamp of the preceding vehicle through an image sensor in the vehicle. The interface 810 may acquire the information on the turn-on state of the brake lamp of the preceding vehicle through a communication unit of the vehicle. A communication techniques employed by the communication unit may include Global System for Mobile (GSM) communication, Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), etc.

The controller 820 may control overall operation of the terminal 800 and process data and signals. The controller 820 may be configured as at least one hardware unit. In addition, the controller 820 may operate by one or more software modules that is generated by executing a program code stored in a memory.

In a case where the brake lamp of the preceding vehicle is in a turn-on state, the controller 820 may monitor operation of the ACC system to recognize whether the ACC system operates abnormally. In a case where a deceleration command has not output from the ACC system for a predetermined time since a turn-on timing of the brake lamp of the preceding vehicle, the controller 820 may recognize that the ACC system operates abnormally. In a case where sensors in the ACC system sense that a distance between the vehicle and the preceding vehicle has not been decreased for the predetermined time after the turn-on timing of the brake lamp of the preceding vehicle, the controller 820 may recognize that the ACC system operates abnormally. In addition, in a case where the sensors in the ACC system sense that a driving speed of the preceding vehicle has not been decreased for the predetermined time since the turn-on timing of the brake lamp of the preceding vehicle, the controller 820 may recognize that the ACC system operates abnormally.

The controller 820 may classify and recognize abnormal operation of the ACC system as one of multiple levels. By considering a driving control command output from the ACC system when the brake lamp of the preceding vehicle is turned on, the controller 820 may classify and recognize abnormal operation of the ACC system as one of multiple levels. Based on a time for which the ACC system operates abnormally during a turn-on period of the brake lamp of the preceding vehicle, the controller 820 may classify and recognize the abnormal operation of the ACC system as one of multiple levels.

In a case where abnormal operation of the ACC system is recognized, the controller 820 may control driving of the vehicle. In a case where the abnormal operation of the ACC system is classified and recognized as one of multiple levels, the controller 820 may control driving of the vehicle according to the recognized level of the abnormal operation of the ACC system.

FIG. 9 shows a block diagram of an autonomous vehicle.

An autonomous vehicle 900 may include a driving device, an Adaptive Cruise Control (ACC) system 920, and a terminal 930. The autonomous vehicle 900 shown in FIG. 9 includes only elements related to the present embodiment. Therefore, those of ordinary skill in the technical field related to the present embodiment will appreciate that general-use elements other than the elements shown in FIG. 9 may be further included.

The driving device 910 may include constituent elements required to drive the autonomous vehicle 900, such as a brake unit, a steering unit, and a throttle. The steering unit may be a combination of mechanisms configured to adjust a direction of travel of the autonomous vehicle. The throttle may be a combination of mechanisms configured to control a speed of the autonomous vehicle 900 by controlling an operating speed of the engine/motor. Also, the throttle may adjust an amount of mixture gas of fuel air flowing into the engine/motor by adjusting an open amount of the throttle, and control power and propulsion by adjusting the open amount of the throttle. The brake unit may be a combination of mechanisms configured to decelerate the autonomous vehicle 900. For example, the brake unit may use friction to reduce a speed of the wheel/tire.

The ACC system 920 may control driving of the autonomous vehicle 900 by controlling the driving device 910. Specifically, the ACC system 920 may control the driving device 910 to ensure a safety distance from a preceding vehicle, thereby adjusting a speed of the autonomous vehicle 900.

The terminal 900 may acquire information on a turn-on state of a brake lamp of a preceding vehicle. When a brake lamp of the preceding vehicle is turned on, the terminal 930 may monitor operation of the ACC system 920 and recognize whether the ACC system 920 operates abnormally. When abnormal operation of the ACC system 920 is recognized, the terminal 930 may control driving of the autonomous vehicle 900 by controlling the driving device 910. A description about the terminal 800 shown in FIG. 8 may apply to the terminal 920, and thus, a redundant description is omitted.

The device described above may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer readable recording medium include magnetic storage media (e.g., ROM, RAM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

The present embodiment may be described in terms of functional block components and various processing steps. Such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An operation method of a terminal included in a vehicle having an Adaptive Cruise Control (ACC) system installed therein, the method comprising:
    acquiring information on a turn-on state of a brake lamp of a preceding vehicle;
    when the brake lamp of the preceding vehicle is in the turn-on state, monitoring operation of the ACC system and recognizing whether the ACC system operates abnormally; and
    when abnormal operation of the ACC system is recognized, controlling driving of the vehicle.

2. The operation method of claim 1, wherein the recognizing comprises, when the ACC system has not output a deceleration command for a predetermined time after a turn-on timing of the brake lamp of the preceding vehicle, recognizing the abnormal operation of the ACC system.

3. The operation method of claim 1, wherein the recognizing comprises, when sensors in the ACC system sense that a distance between the vehicle and the preceding vehicle has not been decreased for a predetermined time since a turn-on timing of the brake lamp of the preceding vehicle, recognizing the abnormal operation of the ACC system.

4. The operation method of claim 1, wherein the recognizing comprises classifying and recognizing the abnormal operation of the ACC system as one of multiple levels,
    wherein the controlling comprises controlling driving of the vehicle according to a recognized level of the abnormal operation of the ACC system.

5. The operation method of claim 4, wherein the recognizing comprises classifying and recognizing the abnormal operation of the ACC system as one of the multiple levels based on a time for which the ACC system operates abnormally during a turn-on period of the brake lamp of the preceding vehicle.

6. The operation method of claim 1, wherein the acquiring comprises acquiring information on the turn-on state of the brake lamp of the preceding vehicle through an image sensor configured to sense an image of the brake lamp of the preceding vehicle.

7. The operation method of claim 1, wherein the acquiring comprises acquiring information on the turn-on state of the brake lamp of the preceding vehicle from the preceding vehicle based on Vehicle-to-Vehicle (V2V) wireless communication.

8. The operation method of claim 1, wherein the controlling comprises;
    applying brake hydraulic pressure of the vehicle; and
    controlling driving of the vehicle to decelerate a driving speed of the vehicle.

9. A computer readable non-volatile recording medium which records a program for implementing the operation method of claim 1 in a computer.

10. A terminal included in a vehicle having an Adaptive Cruise Control (ACC) system installed therein, the terminal including:
    an interface configured to acquire information on a turn-on state of a brake lamp of a preceding vehicle; and
    a controller configured to, when the brake lamp of the preceding vehicle is in the turn-on state, monitor operation of the ACC system and recognize whether the ACC system operates abnormally, and, when abnormal operation of the ACC system is recognized, control driving of the vehicle.

11. The terminal of claim 10, wherein the controller is configured to, when the ACC system has not output a deceleration command for a predetermined time after a turn-on timing of the brake lamp of the preceding vehicle, recognize the abnormal operation of the ACC system.

12. The terminal of claim 10, the controller is configured to, when sensors in the ACC system sense that a distance between the vehicle and the preceding vehicle has not been decreased for a predetermined time since a turn-on timing of the brake lamp of the preceding vehicle, recognize the abnormal operation of the ACC system.

13. The terminal of claim 10, wherein the controller is configured to classify and recognize the abnormal operation of the ACC system as one of multiple levels and control driving of the vehicle according to a recognized level of the abnormal operation of the ACC system.

14. The terminal of claim 13, wherein the controller is configured to classify and recognize the abnormal operation of the ACC system as one of the multiple levels based on a time for which the ACC system operates abnormally during a turn-on period of the brake lamp of the preceding vehicle.

15. The terminal of claim 10, wherein the interface is configured to acquire information on the turn-on state of the brake lamp of the preceding vehicle through an image sensor configured to sense an image of the brake lamp of the preceding vehicle.

16. The terminal of claim 10, wherein the interface is configured to acquire information on the turn-on state of the brake lamp of the preceding vehicle from the preceding vehicle based on Vehicle-to-Vehicle (V2V) wireless communication.

17. The terminal of claim 10, wherein the controller is configured to apply brake hydraulic pressure of the vehicle and control driving of the vehicle to decelerate a driving speed of the vehicle.

18. An autonomous vehicle comprising:
a driving device;
an Adaptive Cruise Control (ACC) system configured to control the driving device; and
a terminal,
wherein the terminal is configured to acquire information on a turn-on state of a brake lamp of a preceding vehicle, when the brake lamp of the preceding vehicle is in the turn-on state, monitor operation of the ACC system and recognize whether the ACC system operates abnormally, and, when abnormal operation of the ACC system is recognized, control driving of the vehicle.

* * * * *